United States Patent [19]

Offringa et al.

[11] Patent Number: 5,241,254
[45] Date of Patent: Aug. 31, 1993

[54] DC FEEDBACK FIRING CONTROL CIRCUIT FOR A DC/THREE-PHASE CURRENT CONVERTER

[75] Inventors: Lodewijk J. J. Offringa, Eindhoven; Eugenio J. F. M. Smits, Nuenen, both of Netherlands

[73] Assignee: CCM Beheer B.V., Neupen, Netherlands

[21] Appl. No.: 911,290

[22] Filed: Jul. 9, 1992

[30] Foreign Application Priority Data

Jul. 9, 1991 [NL] Netherlands ............ 9101204

[51] Int. Cl.⁵ .............................................. H02P 5/00
[52] U.S. Cl. ..................................... 318/800; 318/809
[58] Field of Search ........................... 318/799–812, 318/254, 437, 138; 363/15, 27, 37, 54, 76, 109, 102, 160

[56] References Cited

U.S. PATENT DOCUMENTS

| | | | |
|---|---|---|---|
| 3,609,509 | 9/1971 | Lafuze | 363/161 |
| 4,443,747 | 4/1984 | Chausse et al. | 318/809 X |
| 4,449,087 | 5/1984 | Lippitt et al. | 318/809 X |
| 4,495,451 | 1/1985 | Barnard | |
| 4,539,514 | 9/1985 | Espelage et al. | 318/778 |

FOREIGN PATENT DOCUMENTS

0125320 11/1984 European Pat. Off. .
0160310 6/1985 European Pat. Off. .
3007221 8/1981 Fed. Rep. of Germany .

OTHER PUBLICATIONS

IECEC-89 vol. 6, Aug. 11, 1989, Washington, D.C., U.S. pp. 2897–2902; L. J. J. Offringa et al: 'New Developments in Power Electronics for the Flywheel System Emafer'.
IECEC-87 1987, pp. 1197–1201; F. J. M. Thoolen: 'Electro Mechanical Energy Accumulator for Energy Reuse. A New Concept of an Energy-Storage Device'.
IEE-Forth Int. Conf. on Power Electronics and Variable-Speed Drives Jul. 19, 1990, London, UK pp. 190–195; M. F. Benkhoris et al: 'Modelling and Simulation of a Synchronous Motor Supplied by a GTO Voltage Inverter'.

*Primary Examiner*—Jonathan Wysocki
*Attorney, Agent, or Firm*—Brooks & Kushman

[57] ABSTRACT

Control circuit for semiconductor components of a converter circuit which can be switched on and off to convert direct current into three-phase current. The converter circuit is connected between a direct-current source and the stator of a synchronous machine having a cylindrical rotor. The control circuit measures rotor position and the direct current and determines from the obtained signals the value of the commutation angle $\mu$ of the phase current i in the converter at any value of the direct current $I_d$ on the basis of a model of the synchronous machine which solely takes account of the fundamental harmonic of the phase current i, the firing angle $\alpha$ of the semiconductor components being set between limits determined for any value of the direct current $I_d$ by the associated commutation angle $\mu$.

2 Claims, 4 Drawing Sheets

DC FEEDBACK FIRING CONTROL CIRCUIT FOR A DC/THREE-PHASE CURRENT CONVERTER

BACKGROUND OF THE INVENTION

This invention relates to a control circuit for semiconductor components which can be switched on and off and which form part of a converter circuit for converting direct current into three-phase current, which converter circuit is connected between a direct-current source and the stator of a synchronous machine having a cylindrical rotor, and which control circuit comprises rotor position sensors for sensing the position of the rotor with respect to the stator of the synchronous machine, and also a direct-current measuring device for measuring the value of the direct current.

DISCUSSION OF THE PRIOR ART

In a specific application, the converter circuit containing semiconductor components which can be switched on and off is connected between a direct-current traction machine of a vehicle and a three-phase synchronous machine which is coupled directly to a flywheel and which, like the electrical machines, is situated in the vehicle, and a conversion of electrical energy originating from one of the two machines into a form suitable for the other machine can be achieved using the semiconductor circuit. In this way, to accelerate the vehicle, energy can be drawn from the rotating flywheel by electrically slowing down the synchronous machine, coupled thereto, in generator mode and converting the three-phase current generated in this way into direct current with the aid of the semiconductor circuit and feeding said current to the direct-current traction machine in motor mode. Conversely, energy can be drawn from the moving vehicle, which is coupled to the rotating direct-current traction machine in generator mode, for the purpose of decelerating the vehicle by electrically slowing down the direct-current traction machine and converting the direct current generated in this way into three-phase current with the aid of the semiconductor circuit and feeding said current to the synchronous machine in motor mode, which is thereby accelerated and largely stores the energy released in slowing down the vehicle in the flywheel coupled to it.

Although the energy losses in this arrangement, primarily in the form of frictional losses as a result of the movement of the vehicle, frictional losses in the flywheel bearing and electrical losses in the machines and the converter circuit have to be regularly compensated for, for example by feeding electrical energy from outside the vehicle in a form which is directly suitable for driving the direct-current traction machine or the synchronous machine, or is suitable for that purpose after a conversion in the converter circuit or a converter of this type, the outlined combination of flywheel, synchronous machine, converter and direct-current traction machine and the outlined use thereof produces a particularly energy-efficient vehicle drive system.

The maximum rotational speed chosen for the flywheel is as high as possible in order to be able to store a large amount of energy. The rotor, directly coupled to the flywheel, of the synchronous machine, the term "directly coupled" relating in this case to the fact that the rotor of the synchronous machine and the flywheel form a single entity, should therefore also be suitable, in particular from a mechanical point of view, for high rotational speeds. Such a rotor is a rotor which is equipped with permanent magnets and which furthermore has the advantageous property that no electrical energy has to be fed thereto for energizing purposes. However, a motor energization can also be achieved in another way.

In relatively short-cycle applications such as those, for example, in which the vehicle described above has a public transport function, there is the need to convert an appreciable amount of electrical energy into mechanical energy and vice versa within a short period of time. This imposes high requirements on the control of the converter which, with the high current frequencies and voltage frequencies prevailing within the entire rotational speed range of the flywheel, but in particular within the normal operating range thereof, always has to be capable of reliably converting as large an electric power as possible, given the maximum loading capacities of the electrical machines coupled thereto.

Another application of a converter as described above is seen in an uninterrupted electrical power supply which can absorb temporary interruptions in the mains voltage.

In a converter circuit comprising at least six semiconductor components which can be switched on and off for the purpose of a two-way three-phase conversion, both the switch-on time and the switch-off time of every semiconductor component have to be determined by the control circuit. In addition, a gate holding current has to be supplied during the interval in which a semiconductor component is conducting.

If a direct current commutates between a first and a second semiconductor component, the switch-off instruction for the first semiconductor component in the case of a purely natural commutation should only be given after the natural commutation to the second semiconductor component has been completed. A minimum overlap angle of the control signals during at least the commutation angle $\mu$, when the two semiconductor components are conducting, is necessary to ensure a satisfactory switch-off of the first semiconductor component after the commutation has been completed.

The above requires a design of a control circuit which ensures the switching-off of the first semiconductor component during the extinction advance angle $\beta$. For this purpose in a conventional converter circuit a passage of the phase current through zero, which occurs in a phase after completion of the commutation, is detected with the aid of phase-current measuring devices, after which a switch-off instruction is generated in said phase by the control circuit.

If the switch-off angle of the first semiconductor component is greater than 180°, commutation from the second phase back to the first phase will occur. For this reason, forced commutation is necessary, and the overlap angle of the control signals has to be limited to a maximum value of $180°-\alpha$, where $\alpha$ is the firing angle.

SUMMARY OF THE INVENTION

For a particular combination of a synchronous machine, direct-current source and converter, the object of the invention is to be able to determine the firing angle $\alpha$, the commutation angle $\mu$ and the load angle $\theta$ exclusively on the basis of a measurement of the rotor position and the level of the direct current on the direct-current side of the converter for the purpose of controlling the energy conversion. In this connection, the term "direct current" may also relate to a rectified alternating or three-phase current or any other current whatsoever originating from a direct-voltage source.

To reach the above aim, the control circuit according to the invention comprises computing means which are designed to determine the value of the commutation angle $\mu$ of the phase current i in the converter for any value of the direct current on the basis of a model of the synchronous machine which solely takes account of the fundamental harmonic of the phase current, the firing angle $\alpha$ of the semiconductor components being set between limits (determined for any value of the direct current by the associated commutation angle $\mu$). The range of control for the firing angle $\alpha$ is thus appreciably widened, in particular for low direct currents.

In a preferred embodiment, the computing means are designed to determine the firing angle $\alpha$, the commutation angle $\mu$ and the load angle $\theta$ from a solution of the equations:

$$\phi = \arctan\left(\frac{\sin(2\alpha) - \sin(2\alpha + 2\mu) + 2\mu}{\cos(2\alpha) - \cos(2\alpha + 2\mu)}\right),$$

$$\tan(\theta) = \frac{-1}{\tan(\phi) + \dfrac{2\pi/3}{\dfrac{L_m - L_c}{L_c}\cos(\phi)\sqrt{\sin^2(\mu) + \mu(\sin(2\alpha) - \sin(2\alpha + 2\mu)) + \mu^2}}}$$

and $$\frac{\Phi \cos(\phi - \theta)}{\cos(\phi)} \sqrt{6}\,(\cos(\alpha) - \cos(\alpha + \mu)) = 2 L_c I_d,$$

where $L_m$ and $L_c$ are the synchronous inductance and the commutation inductance, respectively, and $\Phi$ represents a proportionality factor between the angular frequency and the armature voltage E of the synchronous machine.

The claims and advantages will be more readily appreciated as the same becomes better understood by reference to the following detailed description and considered in connection with the accompanying drawings in which like reference symbols designate like parts and like quantities.

BRIEF DESCRIPTION OF THE DRAWINGS

FIG. 10 shows the relationship between the limit values of the firing angle and the direct current $I_d$ for the circuit configuration on which FIG. 9 is based, and FIG. 11 diagrammatically shows the control of the converter circuit.

DESCRIPTION OF THE PREFERRED EMBODIMENT

Figure 1:
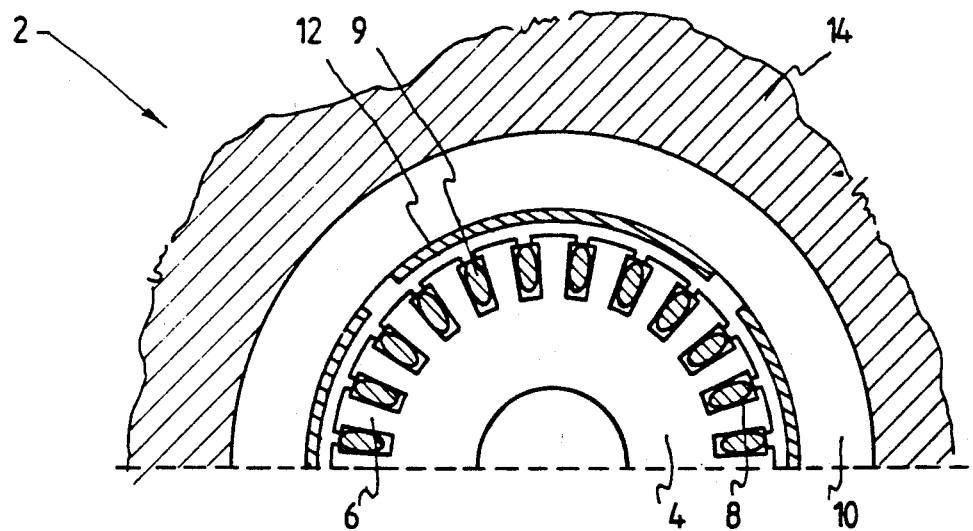
FIG. 1 shows a diagrammatic partial cross section of a synchronous machine with an inner stator and an outer permanent magnet rotor.

FIG. 1 shows a synchronous machine 2 having a fixed, essentially cylindrical stator 4 whose outer circumference is provided with stator teeth 6 which form the boundaries of stator grooves 8 containing windings 9. The rotor 10 whose inner circumference is provided with a number of poles in the form of permanent magnets 12 is rotatable around the stator 4. Mounted at the outer circumference of the rotor 10 is a flywheel body 14.

To describe the behaviour of the direct-current/three-phase current converter when interacting with the permanent magnet machine, use will be made of a simplified equivalent diagram such as is known as a model for the steady state of a synchronous machine having a cylindrical rotor, without the commutation inductance of the machine.

Figure 2:
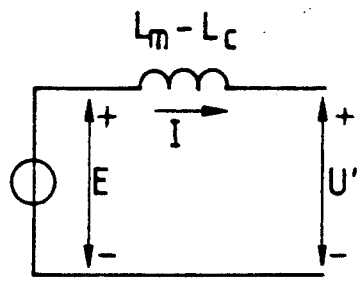
FIG. 2 shows a single-phase electrical equivalent diagram of the machine shown in FIG. 1.
Figure 3:
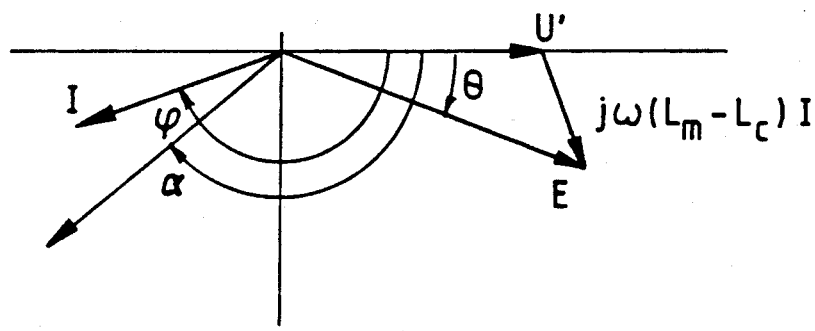
FIG. 3 shows the phasor diagram associated with the equivalent diagram shown in FIG. 2.

FIG. 2 shows a single-phase equivalent diagram of the synchronous machine in which E denotes the armature voltage, I the fundamental harmonic of the current and U' the fundamental harmonic of the virtual phase terminal voltage. The resistance of the windings is assumed to be negligibly small. The synchronous inductance is represented by $L_m$ and the commutation inductance, which is virtually equivalent to the subtransient inductance, by $L_c$. The associated phasor diagram is shown in FIG. 3. The current I, with an angular frequency $\Omega$, lags behind the voltage U' by an angle $\phi$. The load angle is denoted by $\theta$, while the firing angle for the semiconductor components which switch the current is indicated by $\alpha$. In accordance with the phasor diagram in FIG. 3, the relationships between the fundamental harmonic quantities are:

$$E = U'\cos(\theta) + I\Omega(L_m - L_c)\sin(\phi - \theta) \tag{I}$$

$$0 = U'\sin(\theta) + I\Omega(L_m - L_c)\cos(\phi - \theta) \tag{II}$$

In the synchronous machine 2 shown in FIG. 1, the voltage E is induced by the permanent magnets 12 and said voltage is proportional to the coupled flux and the angular frequency $\Omega$. For the calculations, it is assumed that the relationship between the voltage E and the angular frequency $\Omega$ can be expressed with the aid of a constant $\Phi$:

$$E = \Omega \Phi \tag{III}$$

Figure 4:
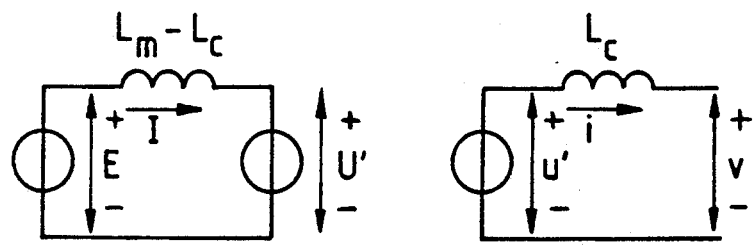
FIG. 4 shows the equivalent diagram shown in FIG. 2, which has been augmented with a circuit for describing the behaviour of the synchronous machine during circuit coupled thereto.

A constant direct current is distributed over the phases of the machine by the switching action of the converter. A commutation of the current in the armature windings during the switching intervals $\mu$ is taken into account in the model by adding an extra equivalent diagram portion to that of FIG. 2, thereby producing the equivalent diagram shown in FIG. 4. In FIG. 4, it holds true that:

$$u'(\omega t) = U\sqrt{2}\sin(\omega t) \tag{IV}$$

and $$i_{\nu=1}(\omega t) = I\sqrt{2}\sin(\omega t - \phi) \tag{V}$$

where $i_{\nu=1}$ denotes that the fundamental harmonic of the armature current i is being referred to. During the intervals in which no commutation takes place, the voltage v at the machine terminals is:

$$v(wt) = u'(wt) \tag{VI}$$

where $$v_{\nu=1}(\omega t) = u'(\omega t) - L_c \frac{di_{\nu=1}}{dt} \tag{VII}$$

Figure 5:
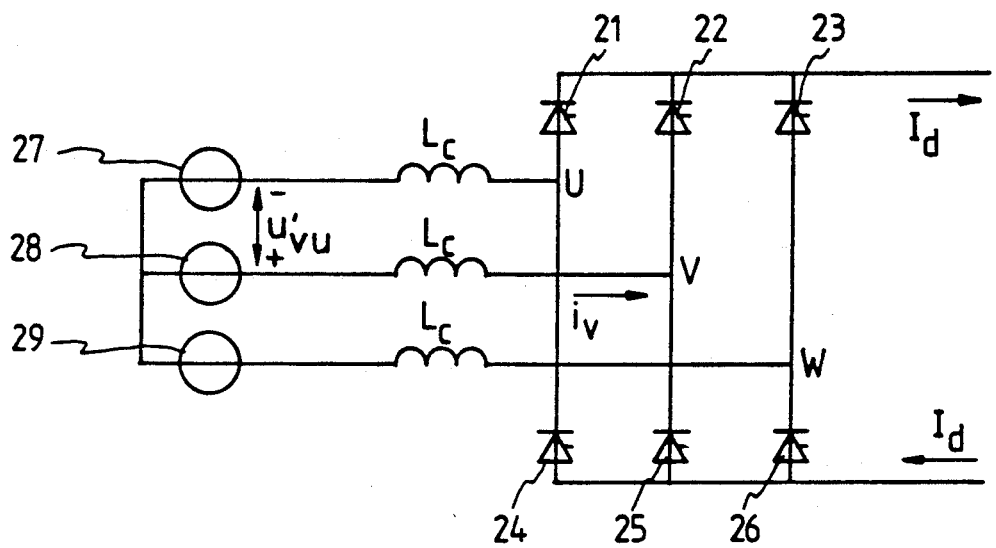
FIG. 5 shows an electrical diagram of a converter circuit coupled to the synchronous machine.

FIG. 5 diagrammatically shows a portion of a two-way three-phase current/direct-current converter circuit comprising six semiconductor components 21-26. The three internal phase voltages on the three-phase current side are represented by alternating-voltage sources 27-29 for the phases U, V and W, respectively. Because of the symmetry in the operation of the converter, it is only necessary to consider one commutation interval (for example the one in which commutation takes place from semiconductor component 21 to semiconductor component 22). It is assumed that the current $I_d$ on the direct-current side remains constant during the commutation. It holds true that:

$$\frac{di_\nu}{dt} = \frac{u'_{\nu u}}{2L_c} \tag{VIII}$$

and $$u'_{\nu u}(\omega t) = u\sin(\omega t) \tag{IX}$$

where $$u = \sqrt{6}\, U \tag{X}$$

Figure 6:
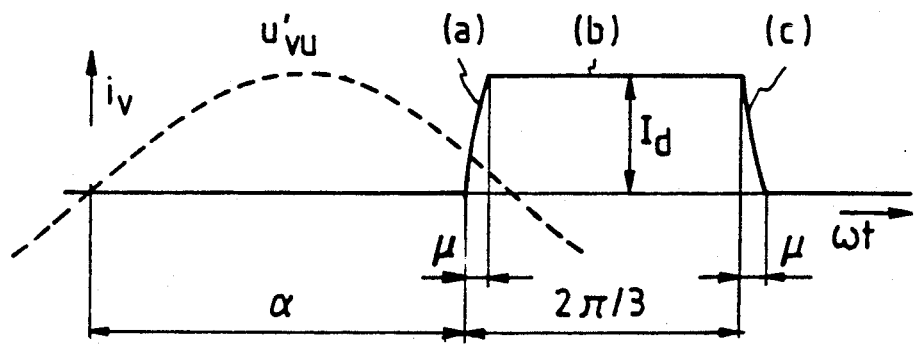
FIG. 6 shows a portion of the waveform of the phase current $i_v$ in the converter circuit shown in FIG. 5.

As FIG. 6 shows, the commutation of the current from semiconductor component 21 to semiconductor component 22 starts at the time when $\Omega t = \alpha$ and the commutation stops at the time when $\Omega t = \alpha + \mu$.

It follows from equations (VIII) and (IX) that:

$$\int_{\omega t = \alpha}^{\omega t = \alpha + \mu} u\sin(\omega t)\, d(\omega t) = 2\omega L_c I_d \tag{XI}$$

which corresponds to:

$$u(\cos(\alpha) - \cos(\alpha + \mu)) = 2wL_c I_d \tag{XII}$$

One half of the current waveform of $i_v$ in phase V is shown in FIG. 6. This half comprises an increasing part (a), a part having a constant value $I_d$ (b) and a decreasing part (c).

From equations (VIII) and (IX), the current in part (a) is:

$$i_v(\omega t) = \frac{u}{2\omega L_c}(\cos(\alpha) - \cos(\omega t)) \tag{XIII}$$

The current in the decreasing part (c) can readily be derived from equation (XIII) with a lag angle $2\pi/3$ (at the instant of commutation from phase V to phase W) and subtracting the value $I_d$:

$$i_v(\omega t) = I_d - \frac{u}{2\omega L_c}(\cos(\alpha) - \cos(\omega t - 2\pi/3)) \tag{XIV}$$

Substitution of the value of $I_d$ derived from equation (XII) yields:

$$i_v(\omega t) = \frac{u}{2\omega L_c}(\cos(\omega t - 2\pi/3) - \cos(\alpha + \mu)) \tag{XV}$$

Figure 7:
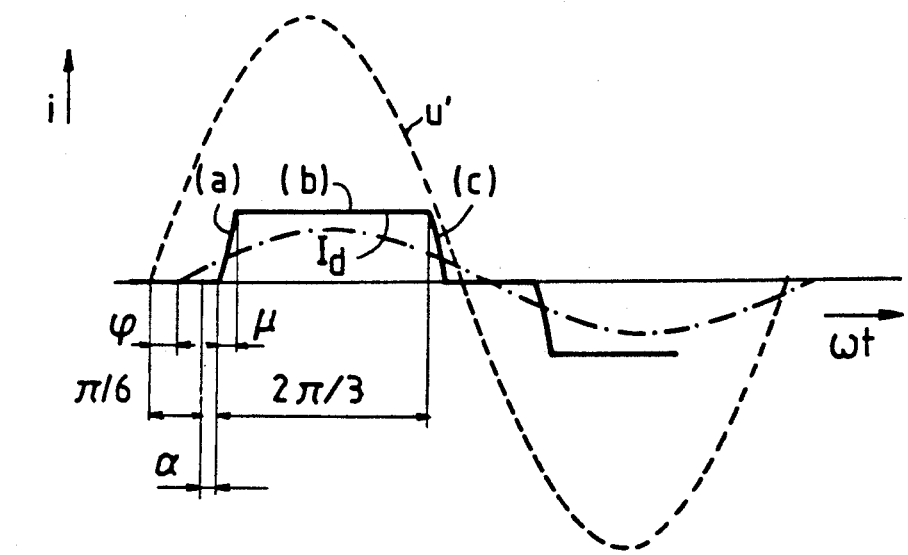
FIG. 7 again shown a portion of the waveform of a phase current i in the converter circuit according to FIG. 5.

FIG. 7 shows the variation in a phase current i. In addition, the variation in the virtual phase voltage $u'(\Omega t)$ in accordance with equation (IV) is shown for the synchronous machine shown in FIG. 1 with the aid of a broken line. The phase shift $\phi$ and the amplitude of the fundamental harmonic of the phase current i indicated with the aid of a chain dotted line will subsequently be calculated.

In the above, the origin of the time angle has been chosen at $\alpha = 0°$. To calculate the phase shift $\phi$, account should be taken of the angle $\pi/6$ as shown in FIG. 7, so that, during the increasing part (a) of the current, it holds true that:

$$i(\omega t) = \frac{u}{2\omega L_c}(\cos(\alpha) - \cos(\omega t - \pi/6)) \tag{XVI}$$

In the constant part (b), it holds true that:

$$i(\omega t) = \frac{u}{2\omega L_c}(\cos(\alpha) - \cos(\alpha + \mu)) = I_d \tag{XVII}$$

and in the decreasing part (c) it holds true that:

$$i(\omega t) = \frac{u}{2\omega L_c}(\cos(\omega t - 5\pi/6) - \cos(\alpha + \mu)) \tag{XVIII}$$

The fundamental harmonic of the phase current i will be described as:

$$i_1 \sin(\omega t - \phi) = a_1 \sin(\omega t) + b_1 \cos(\omega t) \tag{XIX}$$

where $$i_1 = \sqrt{(a_1)^2 + (b_1)^2} \tag{XX}$$

$$\phi = \arctan(-b_1/a_1) \tag{XII}$$

A calculation of $a_1$ and $b_1$ leads to the following results:

$$a_1 = \frac{2}{\pi} \int_0^\pi i(\omega t)\sin(\omega t)d(\omega t) = \qquad (XXII)$$

$$\frac{u\sqrt{3}}{4\pi\omega L_c}(\cos(2\alpha) - \cos(2\alpha + 2\mu))$$

$$b_1 = \frac{2}{\pi} \int_0^\pi i(\omega t)\cos(\omega t)d(\omega t) = \qquad (XXIII)$$

$$\frac{-u\sqrt{3}}{4\pi\omega L_c}(\sin(2\alpha) - \sin(2\alpha + 2\mu) + 2\mu)$$

From this it follows that:

$$\phi = \arctan\left(\frac{\sin(2\alpha) - \sin(2\alpha + 2\mu) + 2\mu}{\cos(2\alpha) - \cos(2\alpha + 2\mu)}\right) \qquad (XXIV)$$

From the equations (XX), (XXII), (XXIII) and (X) it is possible to derive the following for the rms value of the fundamental-harmonic phase current:

$$I = \frac{3U}{2\pi\omega L_c}\sqrt{\sin^2(\mu) + \mu(\sin(2\alpha) - \sin(2\alpha + 2\mu)) + \mu^2} \qquad (XXV)$$

From equations (I) and (II) it follows that:

$$U = \frac{E\cos(\phi - \theta)}{\cos(\phi)} \qquad (XXVI)$$

and $$I = \frac{-E}{\omega(L_m - L_c)\cos(\phi)}\sin(\theta) \qquad (XXVII)$$

In this connection, it is pointed out that the angle $\alpha$ in the phasor diagram shown in FIG. 3 is equal to the firing angle $\alpha$ used in equations (XXIV) and (XXV).

Combination of equations (XXV), (XXVI) and (XXVII) yields:

$$\tan(\theta) = \frac{-1}{\tan(\phi) + \frac{L_m - L_c}{L_c}\cos(\phi)\sqrt{\sin^2(\mu) + \mu(\sin(2\alpha) - \sin(2\alpha + 2\mu)) + \mu^2}} \qquad (XXVIII)$$

From equations (III), (X), (XII) and (XXVI), it is possible for a third relationship to be derived between the angles:

$$\frac{\Phi\cos(\phi - \theta)}{\cos(\phi)}\sqrt{6}(\cos(\alpha) - \cos(\alpha + \mu)) = 2L_c I_d \qquad (XXIX)$$

The equations (XXIV), (XXVIII) and (XXIX) yield a relationship between the angles $\alpha$, $\mu$ and $\theta$ and the direct current $I_d$ for given machine parameters.

$$\alpha_1 = \alpha - \theta \qquad (XXX)$$

it is possible to calculate $\alpha$, $\mu$ and $\theta$ for a given $I_d$ and $\alpha_1$.

Figure 8:
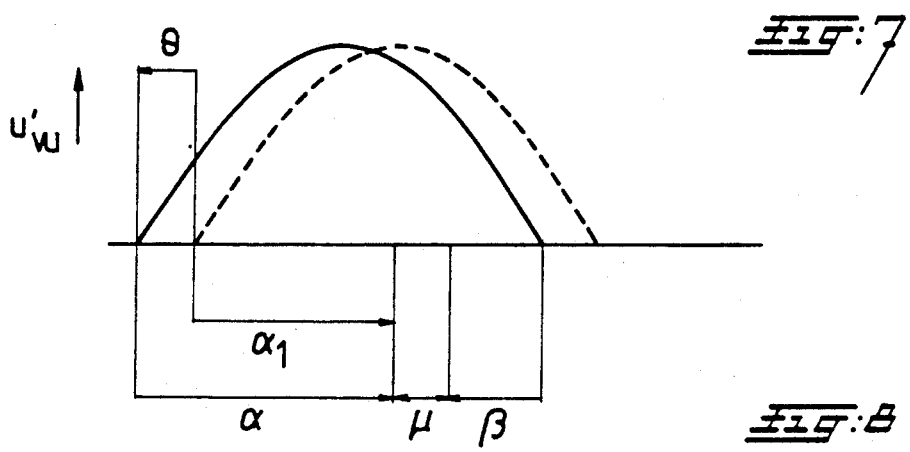
FIG. 8 serves to illustrate the mutual relationships between the various angles.

FIG. 8 shows the relationship between the angles $\alpha_1$, $\alpha$, $\theta$, $\mu$ and $\beta$, the waveform of the virtual terminal voltage $u'_{vu}$ for no-load (broken line) and for loading (continuous line).

The extinction time of a semiconductor component of a converter should fall within the interval determined by the extinction advance angle $\beta$ (see FIG. 8). This ensures that the extinction time does not disturb the commutation or occurs after the time when the terminal voltage reverses. The maximum commutation angle $\mu$ for a certain direct current $I_d$ occurs when the converter is operated with $\alpha=0°$ or $\beta=0°$. The maximum commutation angles $\mu_{max}$ for $\alpha=0°$ and $\beta=0°$, which are equal for a certain direct current $I_d$, are shown for a particular synchronous machine in FIG. 9 as a function of direct current $I_d$.

Figure 9:
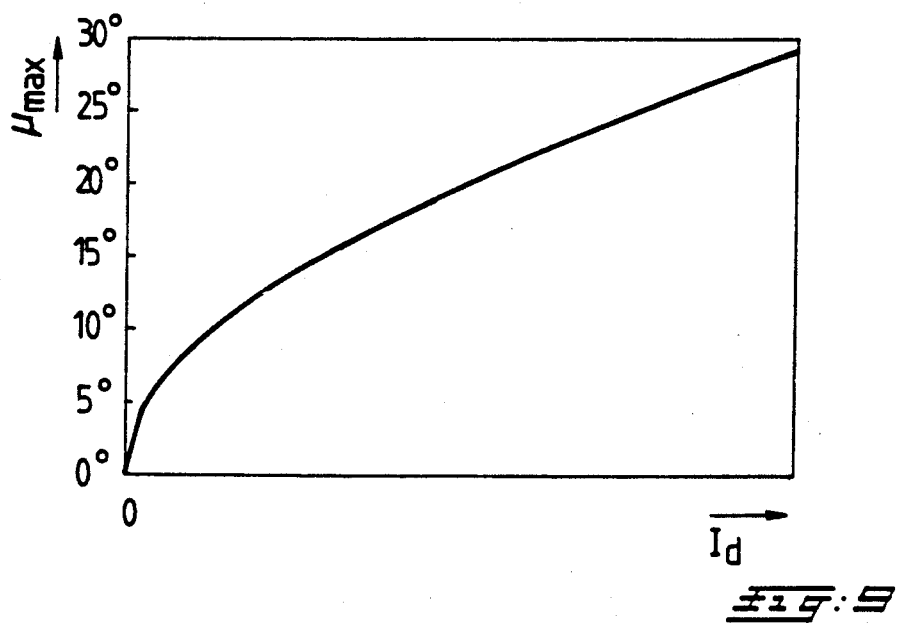
FIG. 9 shows the relationship between the direct current $I_d$ the direct-current side of the converter circuit and the maximum value of the commutation angle for a particular circuit configuration.

The calculated functions can be used to determine the switch-off instant of the semiconductor components in the converter. A commutation angle in the semiconductor component control signals of $\mu_d = \mu_{max}$ as shown in FIG. 9 is sufficient to prevent a disturbance of the commutation under all conditions if the converter is operating in a steady state.

The switching-off of the semiconductor components prior to the polarity reversal of the terminal voltage can be achieved by ensuring that the firing angle $\alpha_1$ is within the interval:

$$\alpha_{1,0} \leq \alpha_1 \leq \alpha_{1,180} \qquad (XXXI)$$

Figure 10:
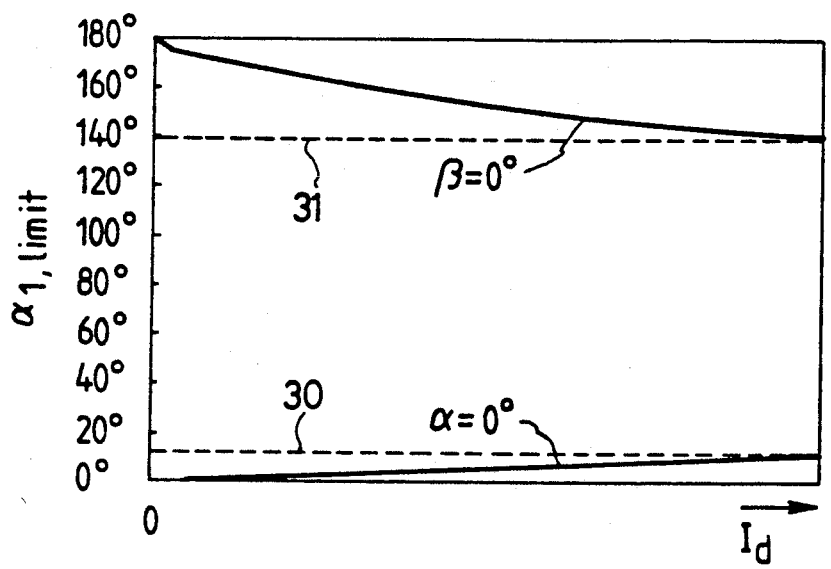

The results of a calculation of the values of $a_{1,limit}$ for both $\alpha=0°$ and $\beta=0°$ ($\alpha_{1,180}$) are shown for a particular synchronous machine in FIG. 10. It is evident from this that the range of control of the converter, the lower and upper limits of which range of control are determined by the lines indicated by $\alpha=0°$ and $\beta=0°$, respectively, for all the values of the direct current $I_d$ lower than the maximum value thereof, is appreciably widened with respect to the range of control which is accomplished in the prior art and whose lower and upper limits are formed by the broken lines indicated by 30 and 31, respectively.

Figure 11:
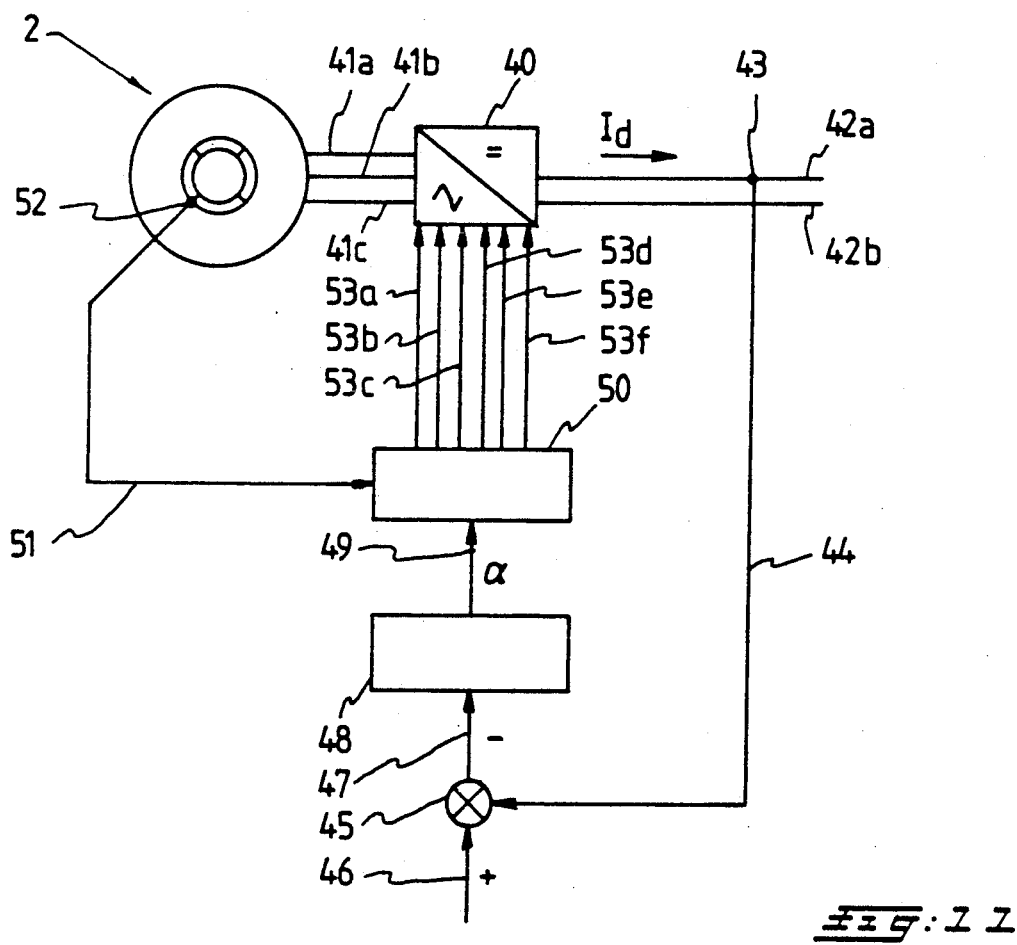

FIG. 11 shows a diagram for the control of a converter circuit such as that shown in FIG. 5. The converter circuit 40 shown here diagrammatically is coupled, on the one hand, to the synchronous machine 2 via three leads 41a–41c and, on the other hand, to a direct-current traction machine (not shown) via two leads 42a and 42b, to which direct-current traction machine a current $I_d$ is delivered by the converter circuit 40. A direct-current measuring device 43 measures the value of the current $I_d$ and feeds current level signal representative of said value via a lead 44 to a comparator 45 in which the value $I_d$ actually occurring is compared with a current set value which is supplied via a lead 46. An output comparison signal, resulting from the comparison, of the comparator 45 is fed via a lead 47 to computing means 48 in which the angles $\alpha$, $\mu$ and $\theta$ are determined with the aid of the abovementioned output signal on the basis of equations (XXIV), (XXVIII) and (XXIX).

It is possible, on the one hand, to calculate the possible combinations of the angles $\alpha$, $\mu$ and $\theta$ beforehand on the basis of the known machine properties and to store these data in tabular form or in a similar manner in the computing means, so that they are available, directly or after interpolation, during the operation of the converter. On the other hand, the angles α, μ and θ can also be calculate in real time during the operation of the converter if one or more sufficiently fast processors is or are incorporated in the computing means.

A firing angle signal representative of the angle α is fed via a lead 49 to a pulse sequence control circuit 50 to which a rotor position measurement signal originating from a rotor position sensor 52 is also fed via a lead 51, which rotor position sensor 52 senses the position of the rotor of the synchronous machine 2 with respect to its stator. In the pulse sequence control circuit 50 gate control pulses are then formed for each semiconductor component to be controlled and transmitted to the converter circuit 40 via leads 53a-53f.

From the rotor position measurement signal it is possible to determine both the rotor revolution speed, and therefore the time per degree (electrical) of the synchronous machine, and a reference time for the determination of the firing time of each semiconductor component.

The pulse sequence control circuit 50 comprises counters known per se into which the start time and the duration of each gate control pulse, or signal can be loaded.

While the invention has been described and illustrated in its preferred embodiment, it should be understood that departures may be made therefrom within the scope of the invention, which is not limited to the details disclosed herein.

What is claimed is:

1. A control circuit for controlling semiconductor components which can be switched on and off and which form part of a converter circuit for converting direct current into three-phase current, which converter circuit is connected between a direct-current source and stator windings of a synchronous machine having a stator and a cylindrical rotor, and which control circuit comprises:

rotor position sensors for sensing the angular position of the rotor with respect to the stator of the synchronous machine and generating a rotor position signal representative of the angular position;

a direct-current measuring device for measuring the level of the direct current and generating a current level signal representative of the level of the direct current;

comparing means for receiving the current level signal, comparing it to a current set value and generating a comparison signal representative of the comparison;

computing means for receiving the comparison signal and determining a value for a commutation angle μ of phase current i in the converter for any level of direct current $I_d$, the determination being based on a synchronous machine model which takes into account solely the fundamental harmonic of the phase current i, a firing angle α of the semiconductor components being set between limits determined for any value of the direct current $I_d$ by the associated commutation angle μ, the computing means generating a firing angle signal representative of the firing angle α; and pulse sequence control means for receiving the rotor position signal and the firing angle signal, determining the angular speed of the rotor and the time per degree of rotation, and generating gate control signals to control the firing time and duration of each of the semiconductor components in the converter circuit.

2. The control circuit as claimed in claim 1, wherein the computing means are designed to determine the firing angle α, the commutation angle μ, and a load angle θ from a solution of the equations:

$$\phi = \arctan\left(\frac{\sin(2\alpha) - \sin(2\alpha + 2\mu) + 2\mu}{\cos(2\alpha) - \cos(2\alpha + 2\mu)}\right),$$

$$\tan(\theta) = \frac{-1}{\tan(\phi) + \dfrac{2\pi/3}{\dfrac{L_m - L_c}{L_c}\cos(\phi)\sqrt{\sin^2(\mu) + \mu(\sin(2\alpha) - \sin(2\alpha + 2\mu)) + \mu^2}}},$$

$$\frac{\Phi\cos(\phi - \theta)}{\cos(\phi)}\sqrt{6}\,(\cos(\alpha) - \cos(\alpha + \mu)) = 2L_c I_d,$$

where $L_m$ and $L_c$ are the synchronous inductance and the commutation inductance, respectively, and Φ represents a proportionality factor between angular frequency Ω and armature voltage E of the synchronous machine.

* * * * *